J. R. CADWELL.
Horse Hay Fork.
No. 49,083.
Patented Aug. 1, 1865.
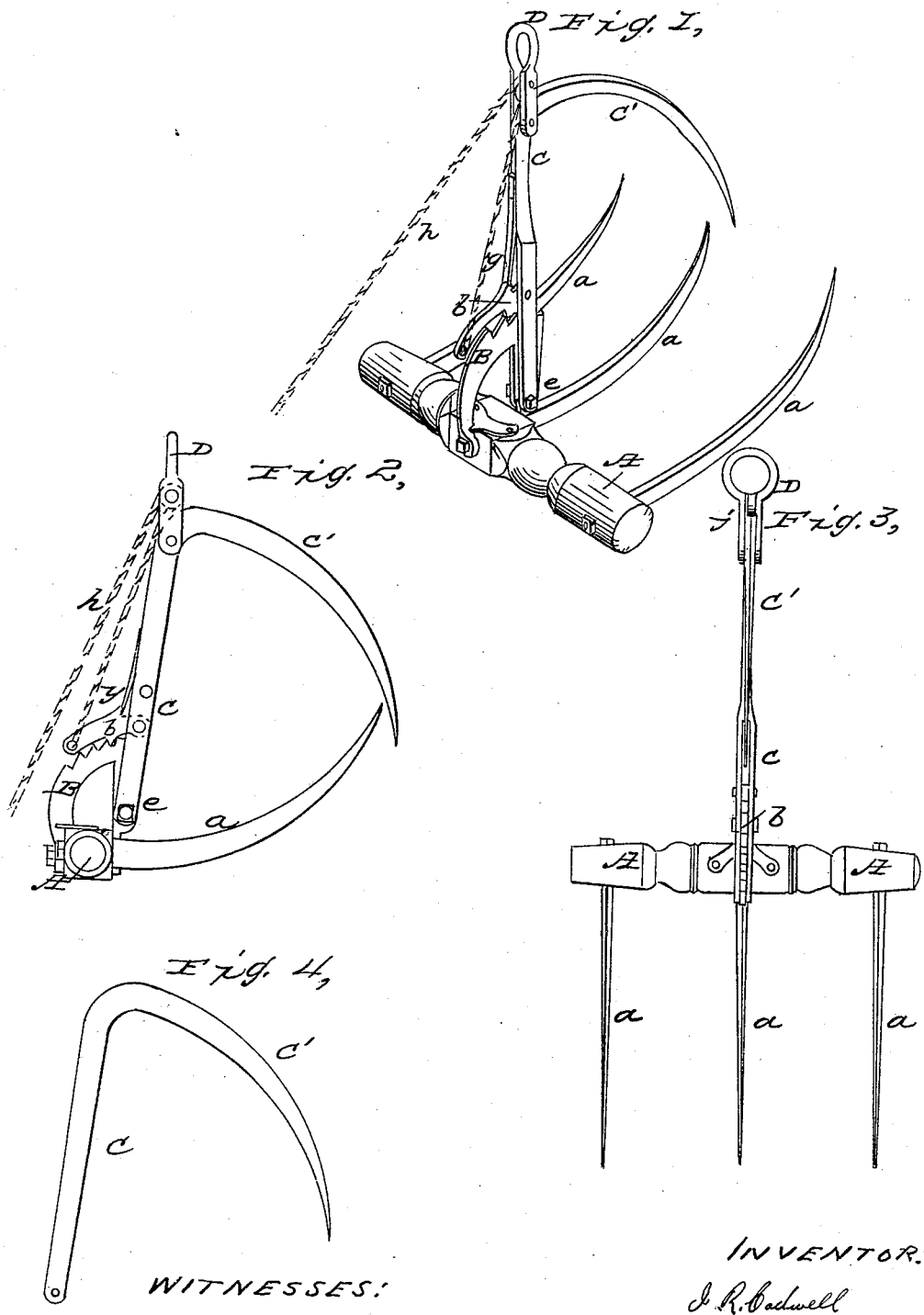
WITNESSES:
INVENTOR:
J. R. Cadwell

UNITED STATES PATENT OFFICE.

J. R. CADWELL, OF DEXTER, MICHIGAN.

IMPROVEMENT IN HORSE HAY-FORKS.

Specification forming part of Letters Patent No. 49,083, dated August 1, 1865.

*To all whom it may concern:*

Be it known that I, J. R. CADWELL, of Dexter, in the county of Washtenaw and State of Michigan, have invented a new and Improved Hay-Elevating Fork; and I do hereby declare that the following is a full, clear, and exact description thereof, reference being had to the accompanying drawings, making a part of this specification, in which—

Figure 1 is a perspective view of my fork adjusted for grasping its load. Fig. 2 is a side elevation of Fig. 1. Fig. 3 is a view of the fork, showing the tines open to their fullest extent. Fig. 4 is a view of the hooked handle or pivoted tooth.

Similar letters of reference indicate corresponding parts in the several figures.

This invention relates to hay-forks which are so constructed that they are adapted for elevating hay and depositing it upon stacks, in barns, or upon wagons.

The object of my invention is to suspend a hay-elevating fork by one of its tines when such tine is pivoted to the head of the supporting-tines and provided with a contrivance for locking it in any desired position with reference to the supporting-tines, and discharging the load when the fork is at an elevated point, as will be hereinafter described.

Another object of my invention is to so construct a fork that in the operation of elevating hay with it the tines will not be liable to meet with obstructions which would stop the ascent of the fork or break it, as will be hereinafter described; also, to construct a fork in such manner that it can be practically employed for grasping and elevating hay and also used as a hand-fork for gathering a load upon its tines, as will be hereinafter described.

To enable others skilled in the art to understand my invention, I will describe its construction and operation.

The fork to which my invention is applied consists of a bar or head, A, and curved tines *a a a*, which latter are secured rigidly to the head A by means of nuts, as represented in the drawings. I prefer to construct the fork which supports the load in this manner, although other forms of forks may be employed.

To the middle of the length of the head A, I secure a plate, B, which is in a plane perpendicular to this head, and which has its curved edge notched for the purpose of receiving a catch, *b*, that is pivoted to a tooth, C, for locking this tooth in any desired position with respect to the tines *a a*. The tooth C is formed with a straight handle portion, terminating in a curved portion, as shown in Figs. 2 and 3, and these two portions may be constructed of a single piece or of two pieces, as may be desired. This tooth C is pivoted at *e* to the plate B, so that when the curved portion is in a position for grasping and confining a load of hay the point of this portion will project beyond and over the points of the teeth *a a* of the supporting-fork, as shown in Figs. 1 and 2, and thus form a guard for preventing the teeth *a a* from meeting with obstructions in the operation of elevating a load of hay and depositing it in barns. The tooth C C' is pivoted to the plate B in advance of the head A, and the tripping-catch *b* is pivoted to the tooth at such a point as will allow it to catch the teeth in plate B and prevent the fork-teeth *a a* from tilting and discharging their load, which operation is effected by releasing the plate B from the catch-piece *b*. This catch is acted upon by a spring, *g*, and also by a cord, *h*. The spring holds the catch in position when it is engaged with the plate B, and the cord *h* is used for lifting the catch and releasing the fork-tines *a a* when the instrument has been elevated to a point for discharging the load. For this purpose the cord *h* passes over a pulley, *j*, which is pivoted to the suspension-loop D, as shown in Figs. 1 and 3. The loop D is pivoted at the upper end of the straight portion of the tooth C, and by means of this loop the fork is suspended from the rope which is used with the elevating machinery.

Instead of pivoting the single tooth C C' to the plate B, it may be pivoted to the head A, or it may be pivoted between two such plates as are represented by the letter B. The tooth C may be formed on or applied in any suitable manner to a bail, which is pivoted to ears projecting from the fork-head or other portion of the fork; or the bail may be pivoted to the extremities of the fork-head A and arranged concentric or eccentric with relation to the motion of the fork-head.

If desirable, more than one tooth may be used and pivoted to the head A, as above described.

The object of leaving one portion of the tooth

C C' straight is to make this tooth serve, when it is adjusted in the position shown in Fig. 3, as a handle by which the operator can grasp the fork and plunge the tines $a\,a\,a$ into a load of hay for the purpose of loading the fork, after which the tooth C is forced over toward the tines $a\,a$ so as to compress and confine the hay upon the fork.

By my invention I obtain a double-grasping fork when loaded and a single fork when unloaded. Consequently a very large bundle of hay can be gathered upon the supporting-tines when the tooth is in the position shown in Fig. 3, and then this bundle can be compressed into a very small compass by forcing the tooth C over it and locking this tooth in the desired position.

Having thus described my invention, what I claim as new, and desire to secure by Letters Patent, is—

1. Constructing the fork with a head, A, and tines $a$ and with an upper grasping tine or tines, C', substantially as and for the purpose set forth.

2. Making the handle C C' of a hay-fork which is constructed with a head, A, and tines $a$ to serve the twofold purpose of a handle and of a grasping-tine, substantially as described.

3. Extending a combined handle and tine, C C', from a pivot on the inner or front side of the head A of a fork, substantially in the manner and for the purpose described.

4. The combination of the tines $a$, head A, pivot $e$, combined handle and tine C C', and pivoted loop D, substantially in the manner and for the purpose described.

5. The combined handle and tine C C', formed substantially as represented in Fig. 4, in combination with the fork A $a$, substantially as set forth.

6. The combination, with a fork constructed with a head, A, and tines $a$, of one or more upper grasping-tines, C', and a locking and tripping device, substantially as and for the purpose set forth.

7. So constructing and applying one or more grasping-tines or teeth to a fork that the ends of said grasping-teeth swing down below and in front of the tines $a$ of the fork, and thus serve the twofold purpose of confining the hay upon the tines $a$ and of a guard for protecting the tines $a$, substantially as set forth.

Witness my hand in the matter of my application for a patent on a hay-elevating fork this 6th day of March, 1865.

J. R. CADWELL.

Witnesses:
R. T. CAMPBELL,
E. SCHAFER.